United States Patent
Tanaka et al.

(10) Patent No.: US 8,898,454 B2
(45) Date of Patent: Nov. 25, 2014

(54) COMMUNICATION DEVICE AND COMMUNICATION METHOD

(71) Applicant: Kabushiki Kaisha Toshiba, Tokyo (JP)

(72) Inventors: Yasuyuki Tanaka, Chigasaki (JP); Yoshihiro Oba, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/670,827

(22) Filed: Nov. 7, 2012

(65) Prior Publication Data

US 2013/0067214 A1  Mar. 14, 2013

Related U.S. Application Data

(63) Continuation of application No. PCT/JP2011/060751, filed on May 10, 2011.

(30) Foreign Application Priority Data

May 10, 2010 (JP) ................................ 2010-108520

(51) Int. Cl.
  *H04W 12/04* (2009.01)
  *H04L 9/08* (2006.01)
  *H04W 12/06* (2009.01)

(52) U.S. Cl.
  CPC .............. *H04L 9/0822* (2013.01); *H04W 12/04* (2013.01); *H04L 9/0833* (2013.01); *H04L 2463/061* (2013.01); *H04W 12/06* (2013.01); *H04L 2463/062* (2013.01)
  USPC ................................ 713/155; 726/3; 380/270

(58) Field of Classification Search
  None
  See application file for complete search history.

(56) References Cited

U.S. PATENT DOCUMENTS

| 7,075,912 B2 | 7/2006 | Suda et al. |
| 7,239,864 B2 | 7/2007 | Zhang |

(Continued)

FOREIGN PATENT DOCUMENTS

| CN | 1685694 | 10/2005 |
| JP | 2001-274784 | 10/2001 |

(Continued)

OTHER PUBLICATIONS

B. Aboba et al. "Extensible Authentication Protocol (EAP), RFC 3748", Network Working Group, [online], Jun. 2004, retrieved May 26, 2011, 67 pages.

(Continued)

*Primary Examiner* — Gilberto Barron, Jr.
*Assistant Examiner* — Malcolm Cribbs
(74) *Attorney, Agent, or Firm* — Nixon & Vanderhye P.C.

(57) ABSTRACT

There is provided a communication device in which a network access authenticating unit executes a network access authentication process with an authentication server to establish a connection to a network, the authentication process including generation of information shared with the authentication server, a communication unit receives an authentication result message from the authentication server when succeeding in the network access authentication process, the authentication result message containing an authentication result indicating success in the network access authentication process and an encrypted network key; a key transport key generating unit generates a key transport key by use of the information generated in the network access authentication process; and a network key acquiring unit acquires a network key by decrypting the encrypted network key contained in the authentication result message with the key transport key, the communication unit encrypts data with the network key and transmits encrypted data to the network.

17 Claims, 12 Drawing Sheets

(56) References Cited

U.S. PATENT DOCUMENTS

| | | | |
|---|---|---|---|
| 8,006,089 B2 | 8/2011 | Ohba | |
| 2005/0124288 A1* | 6/2005 | Karmi et al. | 455/3.01 |
| 2006/0041742 A1* | 2/2006 | Oba | 713/151 |
| 2006/0161771 A1 | 7/2006 | Zhang | |
| 2007/0226499 A1 | 9/2007 | Zhang | |
| 2009/0086973 A1 | 4/2009 | Buddhikot et al. | |
| 2009/0300358 A1* | 12/2009 | Pang et al. | 713/171 |
| 2011/0047592 A1* | 2/2011 | Feder et al. | 726/1 |

FOREIGN PATENT DOCUMENTS

| | | |
|---|---|---|
| JP | 2003-249944 | 9/2003 |
| JP | 2005-536154 | 11/2005 |
| JP | 2007-036350 | 2/2007 |
| JP | 2008-537850 | 9/2008 |
| WO | 2007/091577 A1 | 8/2007 |

OTHER PUBLICATIONS

J. Arkko et al., "Multimedia Internet KEYing" FRC 3830, Aug. 2004.
International Search Report for PCT/JP2011/060751 mailed Jun. 7, 2011.
English-language translation of International Preliminary Report on Patentability.
Extended European Search Report issued Dec. 3, 2013 in counterpart European Patent Application No. 11780610.
Forsberg Nokia Y Ohba D et al. "Protocol for Carrying Authentication for Network Access (PANA); rfc5191.txt", May 1, 2008, pp. 1-46.
Office Action mailed Jun. 11, 2013 in counterpart Japanese Patent Application No. 2010-108520 and English-language translation thereof.
Office Action mailed Sep. 3, 2014 in counterpart Chinese Patent Application No. 201180023123.1 and English-language translation thereof.

* cited by examiner

| AVP Code (16 bits) | AVP Flags (16 bits) | Value (ENCRYPTED NETWORK KEY, VARIABLE LENGTH) |
|---|---|---|
| AVP Length (16 bits) | Reserved (16 bits) | |

FIG. 4

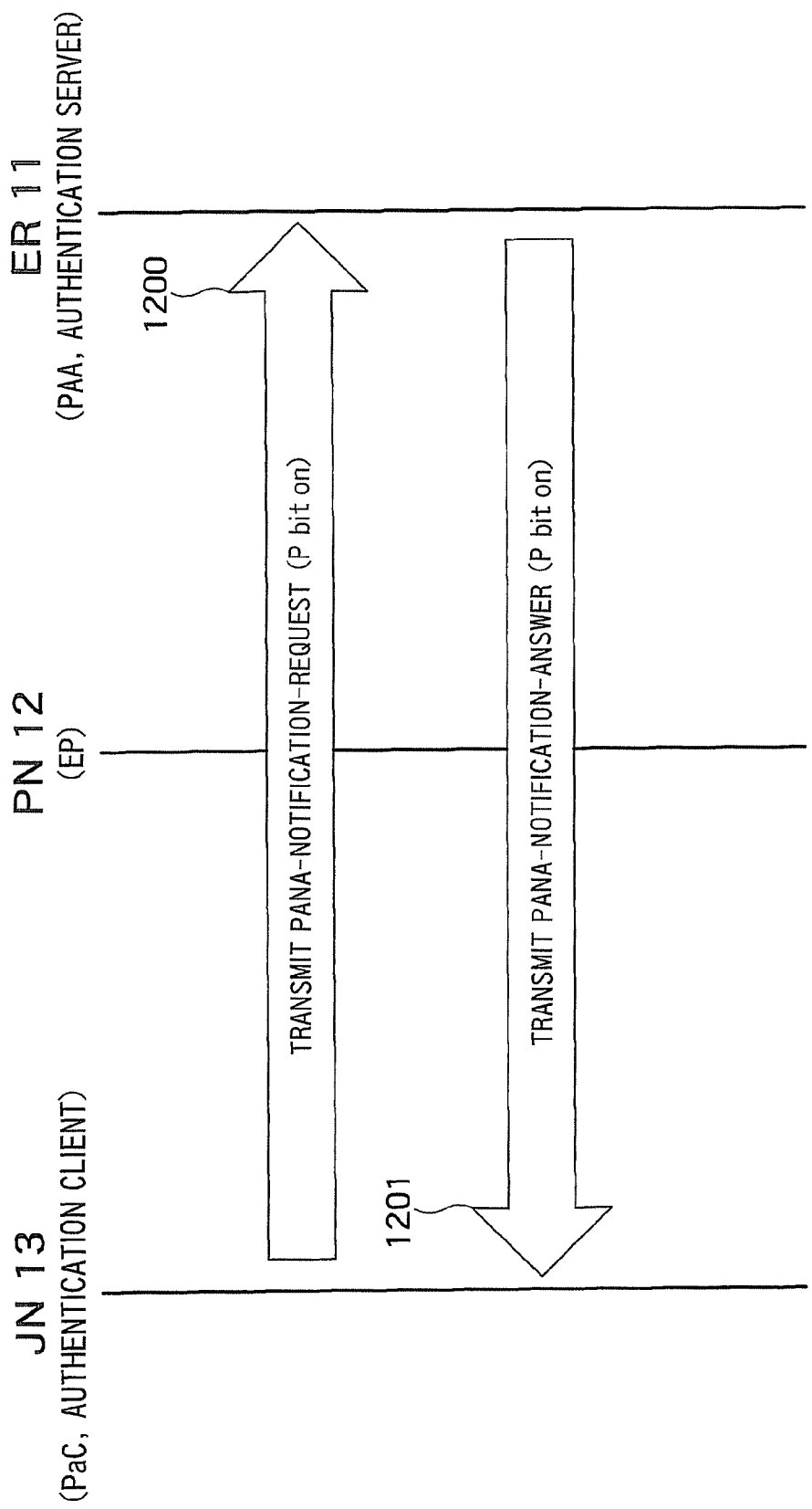

COMMUNICATION DEVICE AND COMMUNICATION METHOD

CROSS REFERENCE TO RELATED APPLICATIONS

This application is a continuation of International Application No. PCT/JP2011/060751, filed on May 10, 2011, the entire contents of which is hereby incorporated by reference.

FIELD

Embodiments of the present invention relate to a communication device and a communication method each configured to share a network key as an encryption key with other pieces of equipment in a network.

BACKGROUND

MIKEY is given as a method of sharing an encryption key among all of nodes within the network. The encryption key can be delivered safely if using MIKEY. Implementation of MIKEY into the equipment manufactured at a low cost such as built-in equipment, however, involves a high cost.

DOCUMENT OF PRIOR ART

[Non-Patent Document 1] RFC 3830 MIKEY: Multimedia Internet KEYing (http://tools.ietf.org/pdf/rfc3830.pdf)

It is desirable to realize delivery of the network key safely and at a low cost.

SUMMARY

In accordance with an embodiment, there is provided a communication device including a network access authenticating unit, a communication unit, a key transport key generating unit and a network key acquiring unit.

The network access authenticating unit executes a network access authentication process with an authentication server in order to establish a connection to a network. The authentication process includes generation of information shared with the authentication server.

The communication unit receives an authentication result message from the authentication server when succeeding in the network access authentication process. The authentication result message contains an authentication result indicating success in the network access authentication process and an encrypted network key.

The key transport key generating unit generates a key transport key by use of the information generated in the network access authentication process.

The network key acquiring unit acquires a network key by decrypting the encrypted network key contained in the authentication result message with the key transport key.

The communication unit encrypts data with the network key and transmits encrypted data to the network.

BRIEF DESCRIPTION OF THE DRAWINGS

FIG. 4 is a diagram illustrating a message format of Network Key AVP.

FIG. 12 is a sequence diagram of updating the network key through the session check process according to a sixth embodiment.

DETAILED DESCRIPTION

First Embodiment

Figure 1:
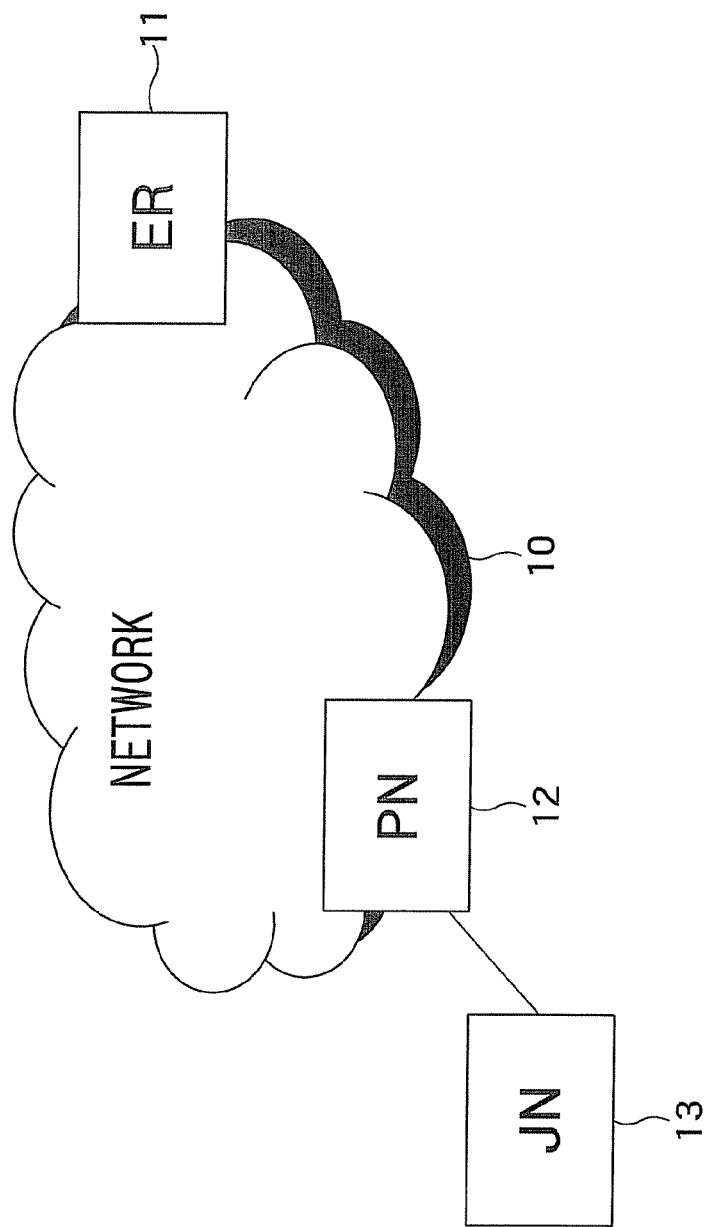
FIG. 1 is a view illustrating a communication system including a communication device according to a first embodiment.

FIG. 1 illustrates architecture (topology) of a communication system including a communication device 13 according to a first embodiment. The communication device will hereinafter be referred to as a joining node (JN) 13.

An edge router (ER) 11 and a parent node (PN) 12 are connected to each other via a network 10. The network 10 is an arbitrary wireless or wired network. The following discussion is based on an assumption that the network 10 is the arbitrary wireless network.

The ER 11 and the PN 12 share a network key with each other in a status enabled to perform mutual communications. The network key is defined as secret information shared among all the nodes joining the network 10 and is used as an encryption key of data transferred and received on the network 10.

It is assumed that the JN 13 neither yet joins the network nor yet holds the network key. For the JN 13, an access authentication to the network is required in order to join the network 10. The network access authentication of the JN 13 is conducted between the JN 13 and the ER 11 via the PN 12. The ER 11 authenticates a node desiring to join the network and permits or inhibits the node to join or from joining the network. The communication between the JN 13 and the PN 12 may be a wireless communication or a wired communication. The following discussion is based on the assumption of using the wireless communications.

During a period till the network access authentication of the JN 13 gets successful since a status where the JN 13 does not yet join the network, the PN 12 operates to forward only the communications related to the network access authentication between the JN 13 and the ER 11 but to cut off the communications of the JN 13 other than those related to the network access authentication. The PN 12 operates to, when the network access authentication gets successful, cancel cutting off the communications related to the JN 13 and to let through the communications other than those related to the network access authentication. This type of cut-off control of the communications can be performed by use of, e.g., a port number on a TCP/IP (Transmission Control Protocol/Internet Protocol) basis.

Figure 2:
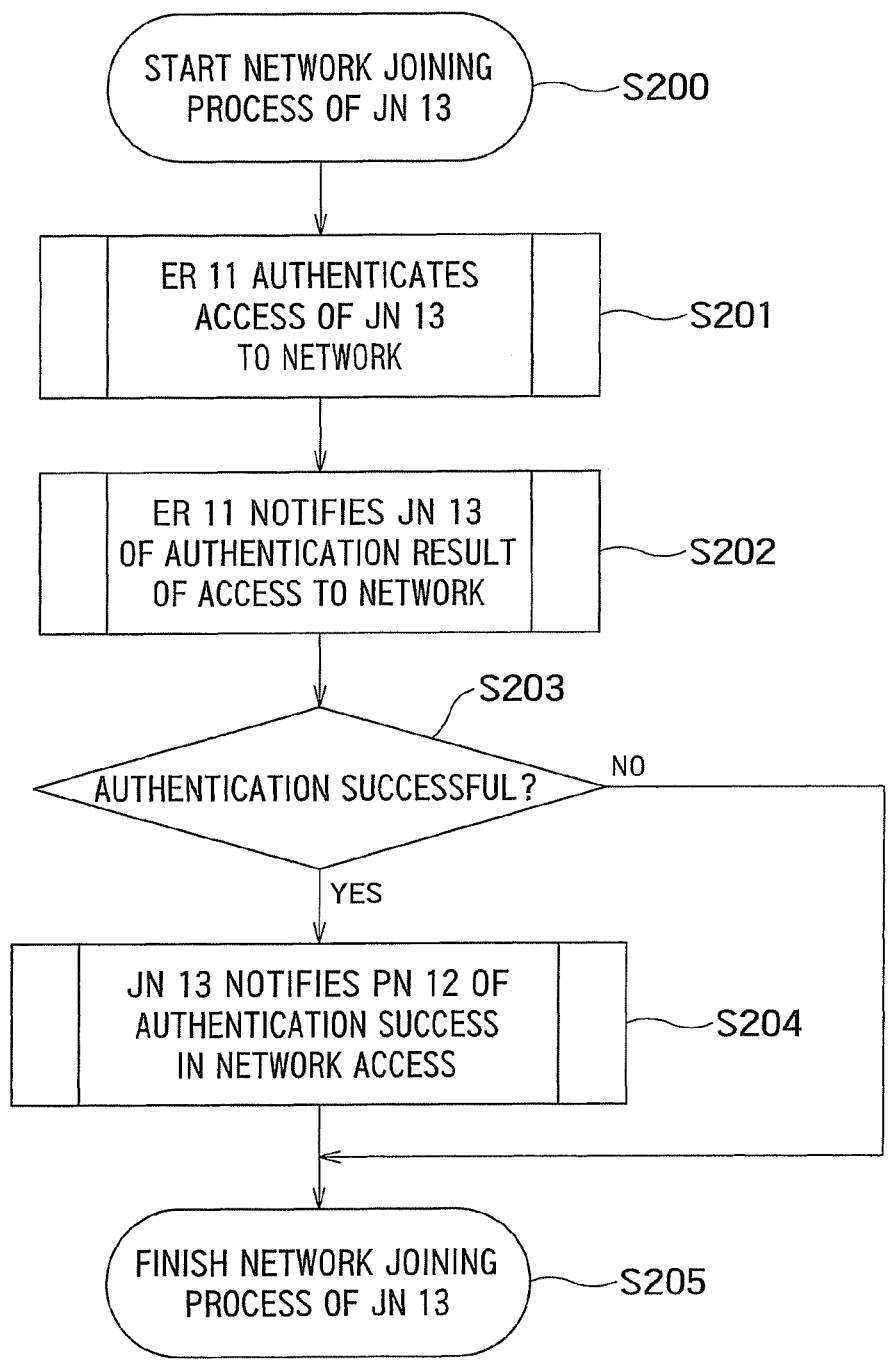
FIG. 2 is a flowchart illustrating a whole processing flow in the first embodiment.

FIG. 2 schematically shows a whole system processing flow in the first embodiment.

Upon starting a network joining process of the JN 13 (S200), the JN 13 executes a network access authentication process between the ER 11 and the JN 13 itself via the PN 12 (S201). The authentication involves a variety of authentication methods such as password authentication and authentication using an electronic certificate and may employ any type of authentication. The network access authentication process includes a process that both of the ER 11 and the JN 13 generate a piece of information (master key) shared with the ER 11 and the JN 13.

When completing the network access authentication process, the ER 11 notifies the JN 13 of an authentication result message containing a result of the network access authentication (S202). If succeeding in the authentication, the ER 11 includes, in the authentication result message, the authentication result indicating the authentication being successful and the encrypted network key. The ER 11 generates a key transport key by use of the shared information (master key) with the JN 13, which is generated in the network access authentication process, and encrypts the network key with this key transport key. The JN 13 generates the key transport key on the basis of the same algorithm as that of the ER 11 in a way that employs the shared information (master key) generated in the network access authentication process in the same way as the ER 11 does. The JN 13 acquires the network key by decrypting the encrypted network key contained in the authentication result message with the key transport key.

If succeeding in the authentication (YES in S203) and when the JN 13 acquires the network key, the JN 13 notifies the PN 12 of the success in the network access authentication by using the network key (S204). The PN 12 can know from this notification that the network access authentication gets successful and hereafter gives a permission to let through the communications also other than those related to the network access authentication with respect to the JN 13. With the processing flow being done so far, the network joining process of the JN 13 is finished (S205).

Whereas if failing in the network access authentication in step S202, the ER 11 transmits the authentication result message to the JN 13 in a way that gets the authentication result indicating the failure in the authentication contained in this message. On this occasion, the encrypted network key is not contained in the authentication result message. The JN 13 receiving the authentication result message indicating the failure determines that the authentication gets unsuccessful, and finishes the network joining process (NO in S203; S205).

Note that the network access authentication may be started by JN 13 and may also be started by ER 11 in step S201.

A further in-depth description of the present system will hereinafter be made. For the explanation's sake, the TCP/IP & related protocols (TCP/IP protocol suite) are presumed to be data communication methods. Further, what is assumed as an authentication method is an EAP (Extensible Authentication Protocol) method by which MSK (Master Session Key) or EMSK (Extended Master Session Key) is output as the shared information (master key), and PANA (Protocol for carrying Authentication for Network Access) is assumed as EAP Transport (a transport mechanism of EAP). At this time, the JN 13 has a function as a PaC (PANA Client) and a function as an authentication client, the PN 12 has a function as an EP (Enforcement Point), and the ER 13 has functions as a PAA (PANA Authentication Agent) and as an authentication server. The following discussion will exemplify a case of using the MSK as the shared information; however, a change necessary for a proper operation pursuant to the specifications of the EAP may be applied to a case of using the EMSK.

Figure 3:
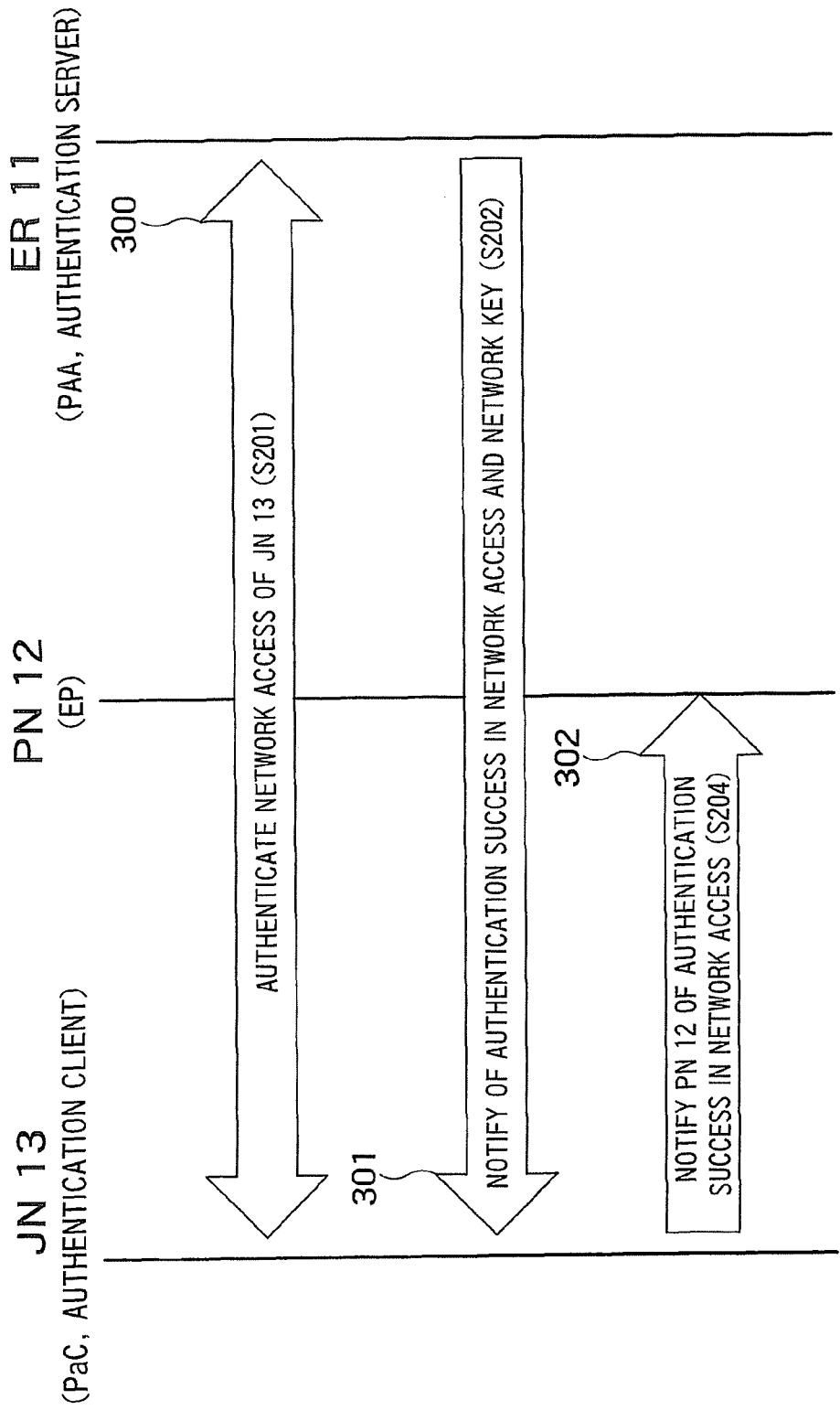
FIG. 3 is a diagram of an outline of a message sequence when succeeding in network access authentication in the first embodiment.

FIG. 3 depicts an outline of a message sequence when succeeding in the network access authentication of the JN 13 in the whole processing flow shown in FIG. 2.

The network access authentication of the JN 13 in step S201 is conducted based on the EAP (Extensible Authentication Protocol) between the JN 13 and the ER 11 (300). In the EAP method, as described above, the MSK is generated and output in the authentication process. Both of the ER 11 and the JN 13 generate the same MSK. The following discussion exemplifies the case of using the MSK as the shared information; however, the change required for the proper operation pursuant to the specifications of the EAP may be applied to the case of using the EMSK. Note that the EAP Transport is to involve using the PANA as described above.

The ER 11 notifies the JN 13 of the network access authentication result message, thus giving the notification of the success in the network access authentication and the network key in step S202 (301). At this time, the ER 11 encrypts the network key with the key transport key. The key transport key is generated by use of the MSK. To be specific, the key transport key is generated by employing a pseudorandom number function or a hash function, of which an argument contains at least the MSK.

For example, when f( ) is defined as the pseudorandom number function, f(MSK, label||option) becomes the key transport key. Herein, a label is "key transport key", "option" is " " (i.e., a null character string), and "|" is a symbol that notates a connection of character strings. Pseudo-random function of PANA SA (Security Association) attributes can be used by way of an example of the pseudorandom number function.

The JN 13 notified of the success in the network access authentication through the sequence 301 generates the key transport key from the MSK by the same method as the ER 11 does, and decrypts the encrypted network key contained in the network access authentication result message with the key transport key. Then, the JN 13 notifies the PR 12 of the success in the network access authentication with respect to the PN 12 in step S204 (302). Note that the key transport key may be generated before receiving the notification of the success in the network access authentication.

Herein, the network access authentication result message in the sequence 301 is realized concretely as a PANA-AUTH-REQUEST message with C bit being "on". The phrase [C bit being "on"] implies that a value in a C bit field defined in a Flags field of a PANA message header is set to "1". Network Key AVP (Attribute-Value Pairs) is used for storing the encrypted network key in PANA-AUTH-REQUEST. FIG. 4 illustrates a message format of Network Key AVP. Network Key AVP is AVP that is newly defined for transporting the encrypted network key.

AVP Code is set to a value, e.g., "10" that is not used at the present. A value "0" is set in AVP Flags (AVP Flags field), and AVP Length indicates a length of Value. The network key encrypted with the key transport key is stored in Value (Value field).

In the notification of the success in the network access authentication in the sequence 302, the mutual authentication is confirmed from such an event that the JN 13 and the PN 12 hold the same network key. When succeeding in notifying of the success in the network access authentication, there occurs a status that the JN 13 and the PN 12 can be mutually authenticated, and items of information, i.e., parameters etc. needed for the communications, such as a Frame Counter are synchronized between the JN 13 and the PN 12. Further, the PN 12 deems the JN 13 to be a valid network node and cancels the cut-off of the communications other than those related to the network access authentication about the JN 13, which has been conducted so far.

Figure 5:
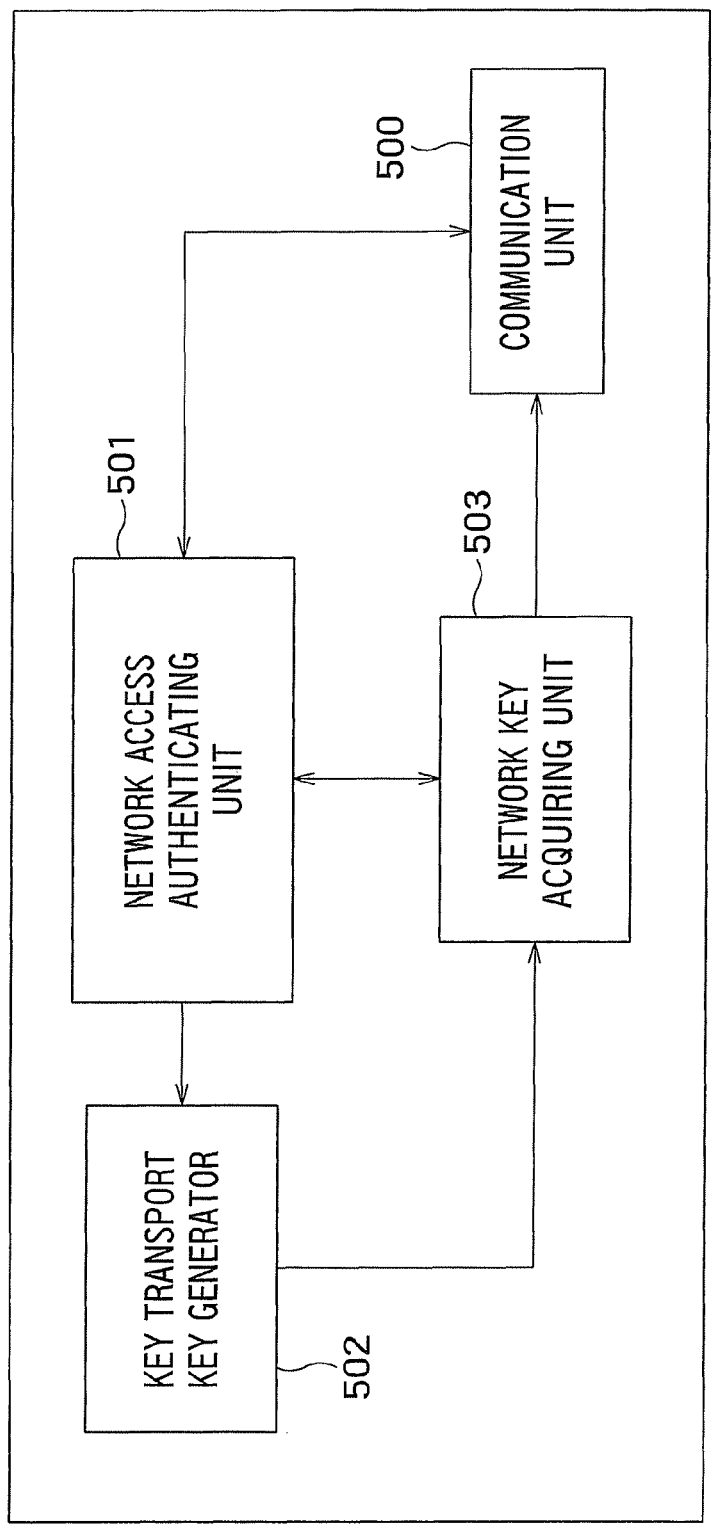
FIG. 5 is a diagram of a configuration of JN (communication device) according to the first embodiment.

FIG. 5 depicts a configuration of the JN 13.

The JN 13 includes a communication unit 500, a network access authenticating unit 501, a key transport key generator 502 and a network key acquiring unit 503.

The communication unit 500 executes processes on a data link layer, a physical layer, etc., and transmits and receives signals to and from the PN 12 through an antenna. The communication unit 500 is equipped with the antenna.

The network access authenticating unit 501 performs the communications in each of the sequences 300, 301, 302 shown in FIG. 3 via the communication unit 500, and executes the process of PaC (PANA Client) and the process of the EAP-based authentication client. Moreover, the network access authenticating unit 501 generates the MSK in the process of the authentication client.

The key transport key generator 502 acquires the MSK from the network access authenticating unit 501, and generates the key transport key from the MSK by the technique (the key generation algorithm).

The network key acquiring unit 503 acquires the key transport key from the key transport key generator 502, and decrypts the encrypted network key within the Network Key AVP, which is received by the network access authenticating unit 501, with the key transport key, thereby acquiring the network key. The network key acquiring unit 503 provides the acquired network key to the network access authenticating unit 501 and the communication unit 500.

The network access authenticating unit 501 notifies the PN 12 of the success in the network access authentication by use of the network key obtained from the network key acquiring unit 503.

The communication unit 500, in the way of employing the network key obtained from the network key acquiring unit 503, encrypts data to be transmitted, generates and assigns a message authentication code, further decrypts the received data, and verifies integrity of the data. The data to be transmitted is generated by an application unit. Further, the decrypted data is handed over to the application unit. The application unit, though included by the communication unit 500, may also be provided within JN 13 as a processing unit separated from the communication unit 500. The application unit may be enabled to specify whether the data is encrypted and whether the data is decrypted.

Figure 6:
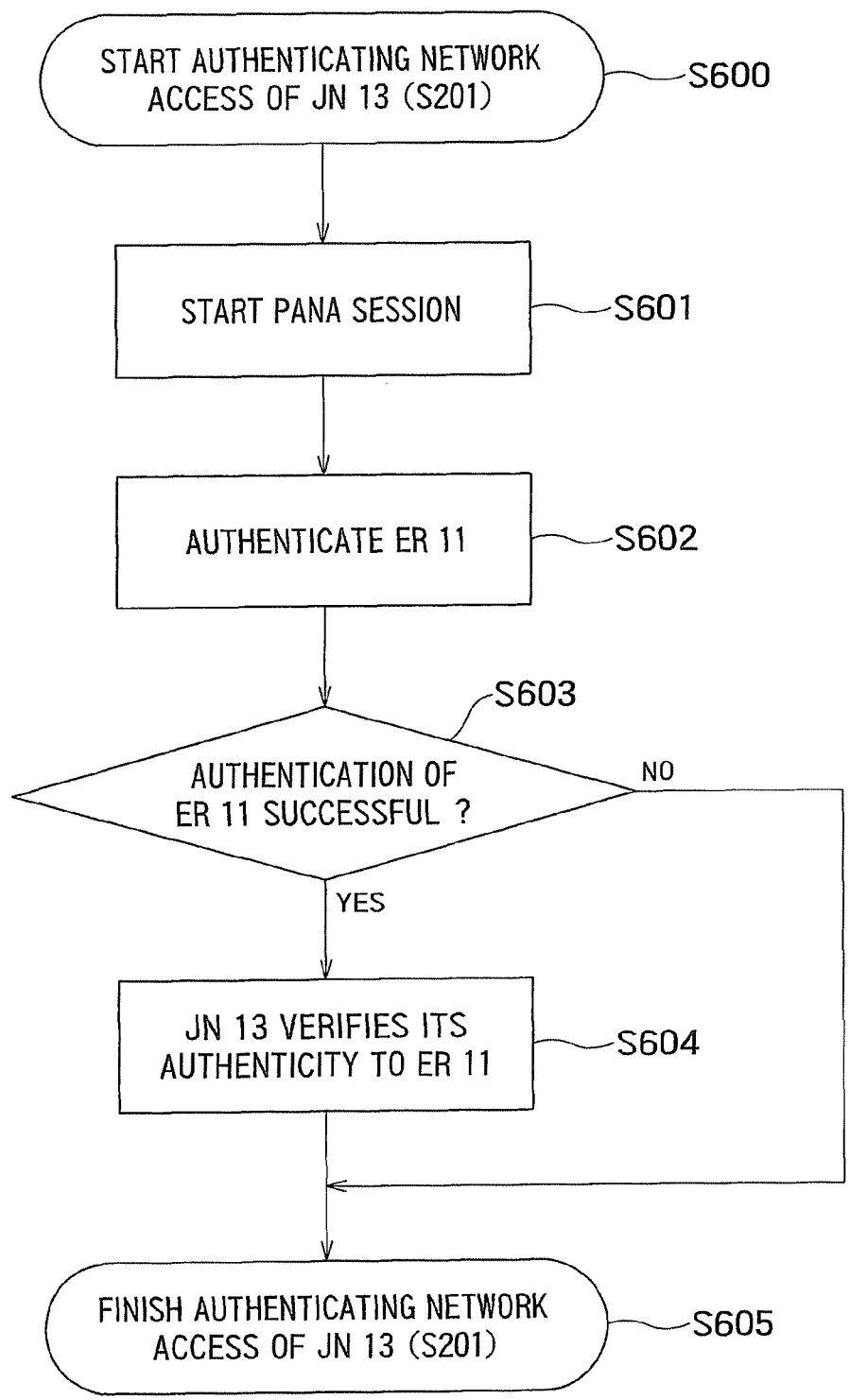
FIG. 6 is a flowchart of a network access authentication process of the JN.

FIG. 6 illustrates a processing flow of the JN 13 in step S201 of FIG. 2.

To start with, in step S601, the JN 13 initiates a PANA session by transmitting a PANA-Client-Initiation message to the ER 11.

Next, in step S602, the JN 13 authenticates the ER 11. If the JN 13 succeeds in the authentication of the ER 11 (YES in S603), the JN 13 verifies authenticity of the JN 13 to the ER 11 (i.e., the ER 11 is made to conduct the authentication of the IN 13) (S604). With the processes being done so far, the network access authentication of the JN 13 is finished (S605).

Whereas if the JN 13 fails in the authentication of the ER in step S602 (NO in S603), the network access authentication is immediately finished (S605).

Figure 7:
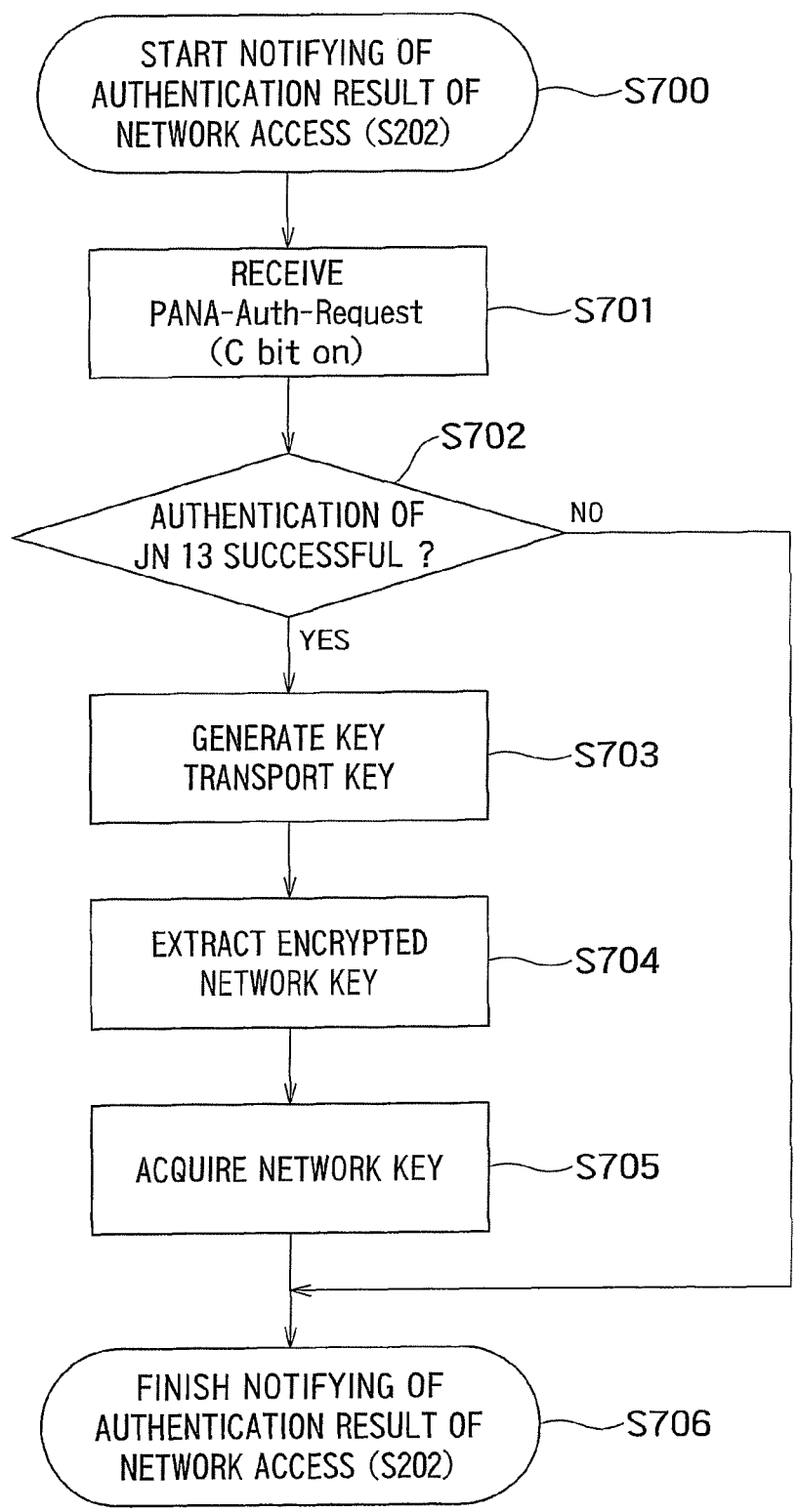
FIG. 7 is a flowchart of a network access authentication result notifying process of the JN.

FIG. 7 illustrates a processing flow of the JN 13 in step S202 of FIG. 2.

At first, in step S701, the JN 13 receives the PANA-AUTH-REQUEST message (authentication result message) with C bit being "on" from the ER 11.

If Result-Code AVP Value (authentication result) in the PANA-AUTH-REQUEST message indicates PANA_SUCCESS (success) (YES in S702), the key transport key is generated from the MSK specified by Key-Id AVP Value in the PANA-AUTH-REQUEST message (S703) (an ID of the MSK is generated simultaneously when generating the MSK and is stored in Key-Id AVP Value).

Next, in step S704, the encrypted network key is extracted from Network Key AVP in the PANA-AUTH-REQUEST message.

Subsequently, in step S705, the encrypted network key is decrypted by using the key transport key, thus acquiring the network key. The present process is hereby terminated (S706).

On the other hand, if Result-Code AVP Value is PANA_AUTHENTICATION_REJECTED or PANA_AUTHORIZATION_REJECTED, it is determined that the authentication gets into the failure, and the present process is immediately finished (S706).

Figure 8:
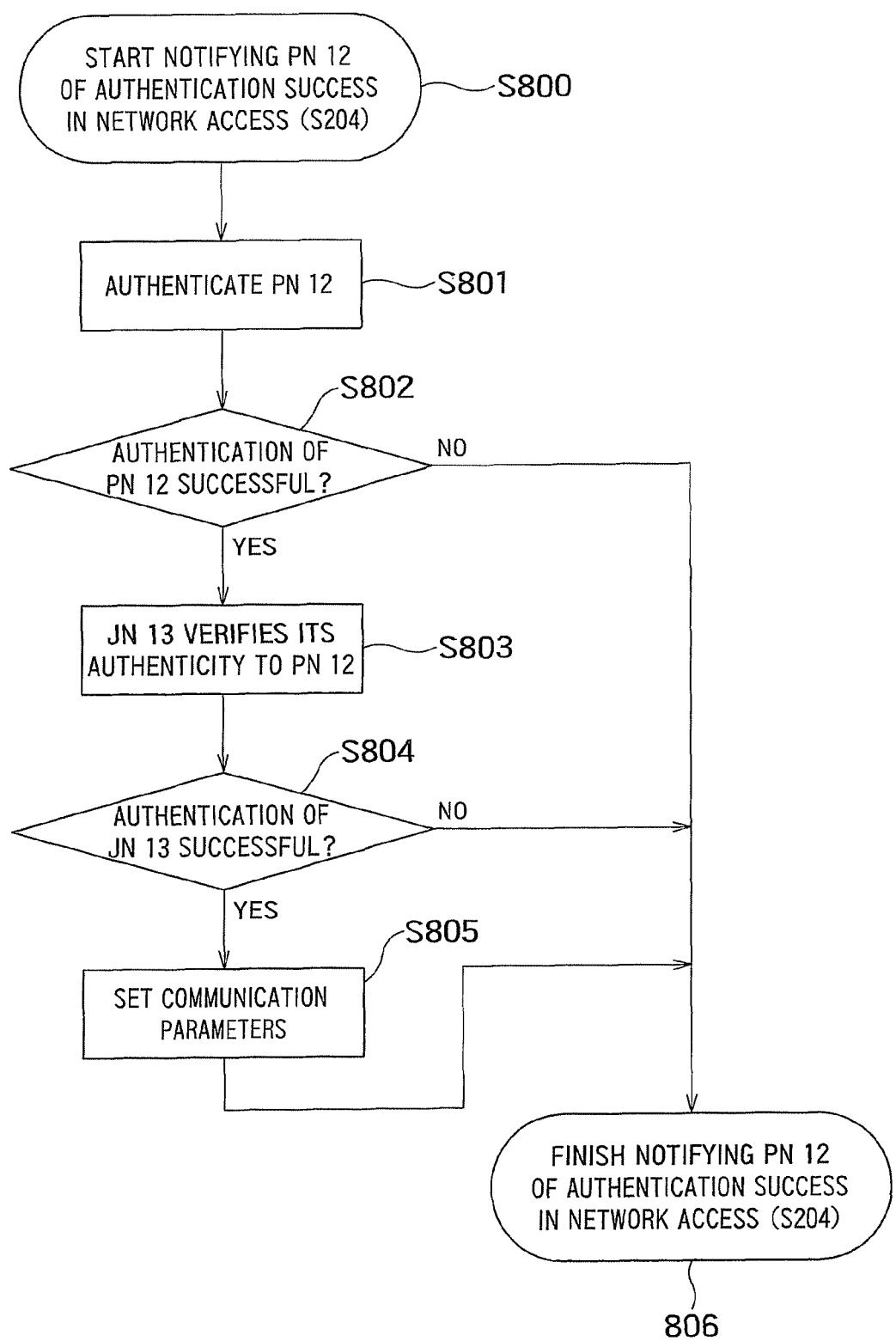
FIG. 8 is a flowchart of a process of how the JN notifies PN of success in the network access authentication.

FIG. 8 illustrates a processing flow of the JN 13 in step S204 of FIG. 2.

At first, in step S801, the authentication of the PN 12 is carried out. The authentication of the PN 12 involves using the network key.

If succeeding in the authentication of the PN 12 (YES in S802), the JN 13 verifies its authenticity to PN 12 (S803). Namely, the PN 12 is made to authenticate the JN 13, and the verification of the authenticity of the JN 13 employs the network key.

If succeeding in the authentication of the JN 13 (YES in S804), the JN 13 sets, in the communication unit 500, the network key and the communication parameters such as Frame Counter exchanged during the authentication process in step S801 and step S803 (S805), and the present process comes to an end (S806).

Whereas if succeeding neither in the authentication of the PN 12 nor in the authentication of the JN 13 (NO in S802, NO in S804), the present process is immediately finished (S806).

The discussion made above uses the TCP/IP as the data communication method, however, if capable of implementing what is equivalent thereto, other protocols and other communication methods are also available without being limited to TCP/IP.

The following is a specific applied example of the first embodiment.

The first embodiment can be applied to, e.g., a remote meter inspection system for home power consumption.

In this case, for instance, a smart meter corresponds to the JN 13, a wireless base station installed outside the home corresponds to the PN 12, and a local router performing the wireless communications with the PN 12 and connected to a power company system via a cable line corresponds to the ER 11. The network 10 can involve using, e.g., a ZigBee network. An operating example is that the smart meter encrypts measurement data with the network key and transmits the encrypted measurement data. The encrypted measurement data is transported to the local router via a single or a plurality of wireless base stations. The local router decrypts the encrypted measurement data with the network key, and transmits the measurement data to the power company system by a separate secure method (e.g., a dedicated line). Further, the local router encrypts the data transmitted from the power company system with the network key, and transmits the encrypted data to the smart meter via the single or the plurality of wireless base stations. The smart meter decrypts the received encrypted data with the network key.

Moreover, another available example is that the smart meter corresponds to the JN 13, the wireless base station installed in the home corresponds to the PN 12, and a home router performing the wireless communications with the PN 12 and connected to the power company system through the cable line corresponds to the ER 11.

A configuration in the case of actually applying the first embodiment is not, however, limited to these examples.

As described above, according to the first embodiment, the authentication result message of the network access authentication contains the network key encrypted with the key transport key based on the shared information that is generated in the network access authentication process, thereby enabling the network key to be delivered and shared safely and at a low cost.

Second Embodiment

In the first embodiment, Network Key AVP Value contains the encrypted network key; however, a second embodiment is that Network Key AVP Value contains the network key encrypted with the key transport key and a key identifier, encrypted with the key transport key, for identifying the network key.

The JN 13 decrypts a cipher text stored in Network Key AVP Value with the key transport key, thereby acquiring the network key and the key identifier associated with this key. The JN 13 manages the acquired network key and the key identifier in the way of associating the network key and the key identifier with each other. The ER 11 encrypts the data and transmits the encrypted data, in which case the key identifier is transmitted together with the encrypted data, while the JN 13 uses the network key associated with the key identifier attached to the transmitted data when decrypting the received data. The decryption using the valid network key can be thereby done at all times, and it is feasible to prevent an error from being caused due to try of the decryption with an invalid network key.

Third Embodiment

A third embodiment exemplifies a case in which after step S205 of FIG. 2 in the first embodiment (after the JN 13 has joined the network), the ER 11 determines to update the network key for use and safely notifies the JN 13 of an updated network key (i.e., a new network key).

Figure 9:
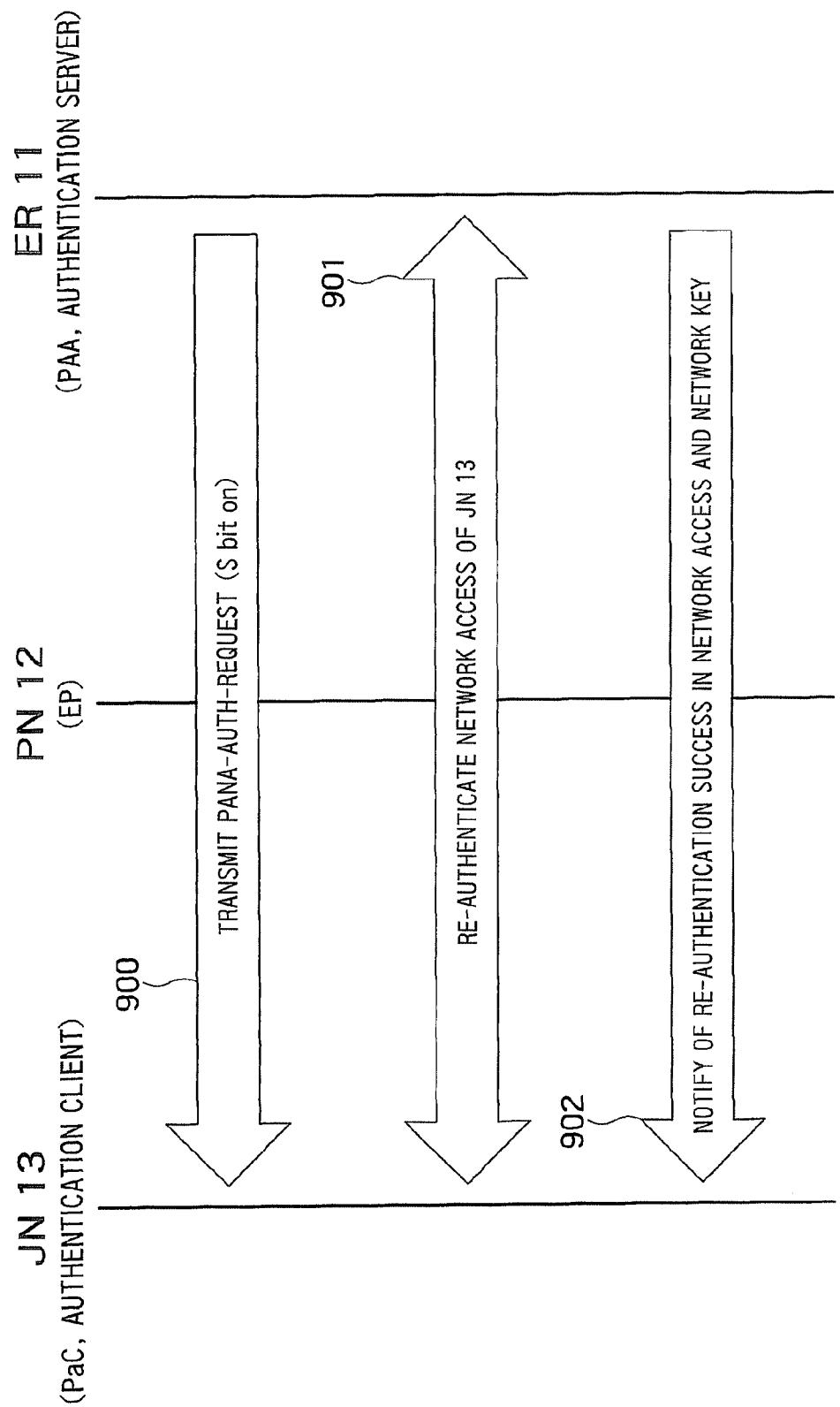
FIG. 9 is a sequence diagram of updating the network key through a re-authentication process according to a third embodiment.

FIG. 9 depicts an outline of a message sequence in the third embodiment.

To begin with, the ER 11 determines to update the network key due to a validated date of the network key being in use. The ER 11 determining to update the network key transmits a PANA-AUTH-REQUEST message with S bit being "on" to the JN 13 (900), thereby performing the network access re-authentication (901). Herein, the sequences 900 and 901 are the same processes as in the case of normal PANA. Note that a new MSK (or EMSK) is generated in the re-authentication process, and both of the ER 11 and the JN 13 newly generate the same key transport key according to the generation of the new MSK.

In a next sequence 902, the ER 11 transmits PANA-AUTH-REQUEST (a first authentication result message) with C bit being "on" and containing Network Key AVP to the JN 13. This sequence is the same process as step S202 of FIG. 2 in the case of the success. The encrypted new network key (a first network key) is stored in Network Key AVP Value. The JN 13 decrypts the encrypted new network key with the new key transport key, thus acquiring a new network key.

The third embodiment can be also combined with the second embodiment. In this case, Network Key AVP Value in the re-authentication result message (a first authentication result message) contains the new network key encrypted with the new key transport key and the key identifier encrypted with the new key transport key.

As described above, according to the third embodiment, the network access re-authentication is carried out also in the case where the ER 11 updates the network key for use, and the re-authentication result message contains the updated encrypted network key, thereby enabling the updated network key to be delivered and shared safely and at the low cost.

Fourth Embodiment

In the third embodiment, the re-authentication process is initiated from the side of the ER 11; however, a fourth embodiment exemplifies a case in which the re-authentication process is initiated from the side of the JN 13, thereby notifying the JN 13 of the updated network key.

Figure 10:
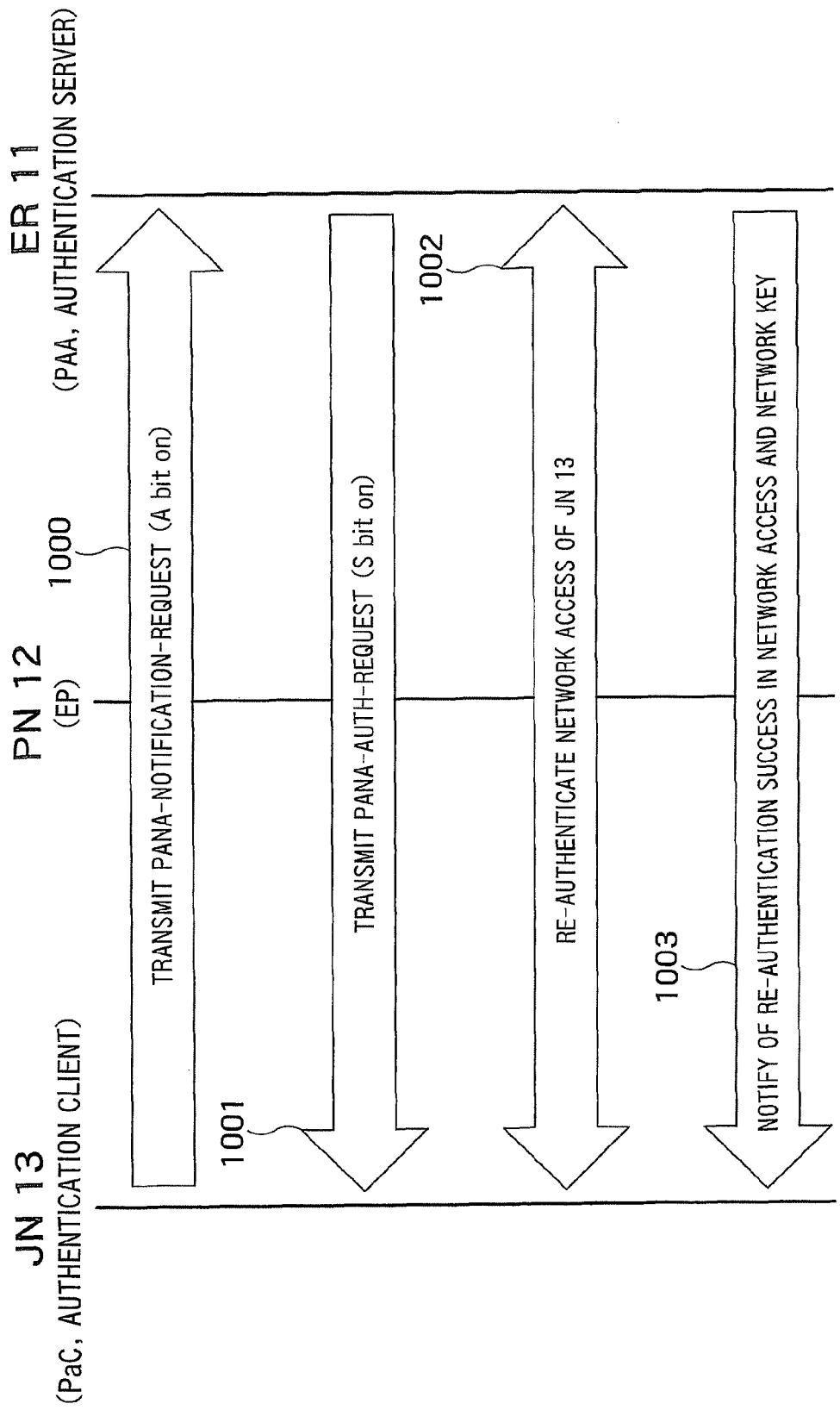
FIG. 10 is a sequence diagram of updating the network key through the re-authentication process according to a fourth embodiment.

FIG. 10 illustrates an outline of the message sequence according to the fourth embodiment.

The JN 13, when detecting that the network key held by the JN 13 itself has already become invalid, transmits a PANA-NOTIFICATION-REQUEST message with A bit being "on" to the ER 11 in order to acquire a new network key from the ER 11, thus requesting the ER 11 to carry out the re-authentication (1000). The case of the network key's having already become invalid is exemplified by the case that the encrypted data, when received, cannot be decrypted with the network key held by the JN 13. Alternatively, there is a case in which the key identifier attached to the data is not coincident with the key identifier (the latest key identifier acquired most recently) of the network key held by the JN 13.

The ER 11 receiving the PANA-NOTIFICATION-REQUEST message with A bit being "on" transmits PANA-AUTH-REQUEST with S bit being "on", which represents a start of the authentication, to the JN 13 (1001), and hereafter the sequences are the same as the sequences in the third embodiment. To be specific, the network access re-authentication is conducted between the JN and the ER 11 (1002), and, if succeeding in the re-authentication, the ER 11 transmits PANA-AUTH-REQUEST (the first authentication result message) with C bit being "on" and containing Network Key AVP to the JN 13 (1003). An encrypted one of a new network key (a first network key) is stored in Network Key AVP Value.

Similarly to the third embodiment, the fourth embodiment can be also combined with the second embodiment.

As described above, according to the fourth embodiment, also in the case of initiating the re-authentication process from the side of the JN 13, the updated network key can be delivered and shared safely and at the low cost.

Fifth Embodiment

In the third and fourth embodiments, the JN 11 is notified of the updated network key through the PANA-AUTH-REQUEST message with S bit being "on", however, a fifth embodiment exemplifies a case of notifying of the updated network key by making use of another message, specifically, a PANA-NOTIFICATION-REQUEST message (a session check request message) with P bit being "on".

Figure 11:
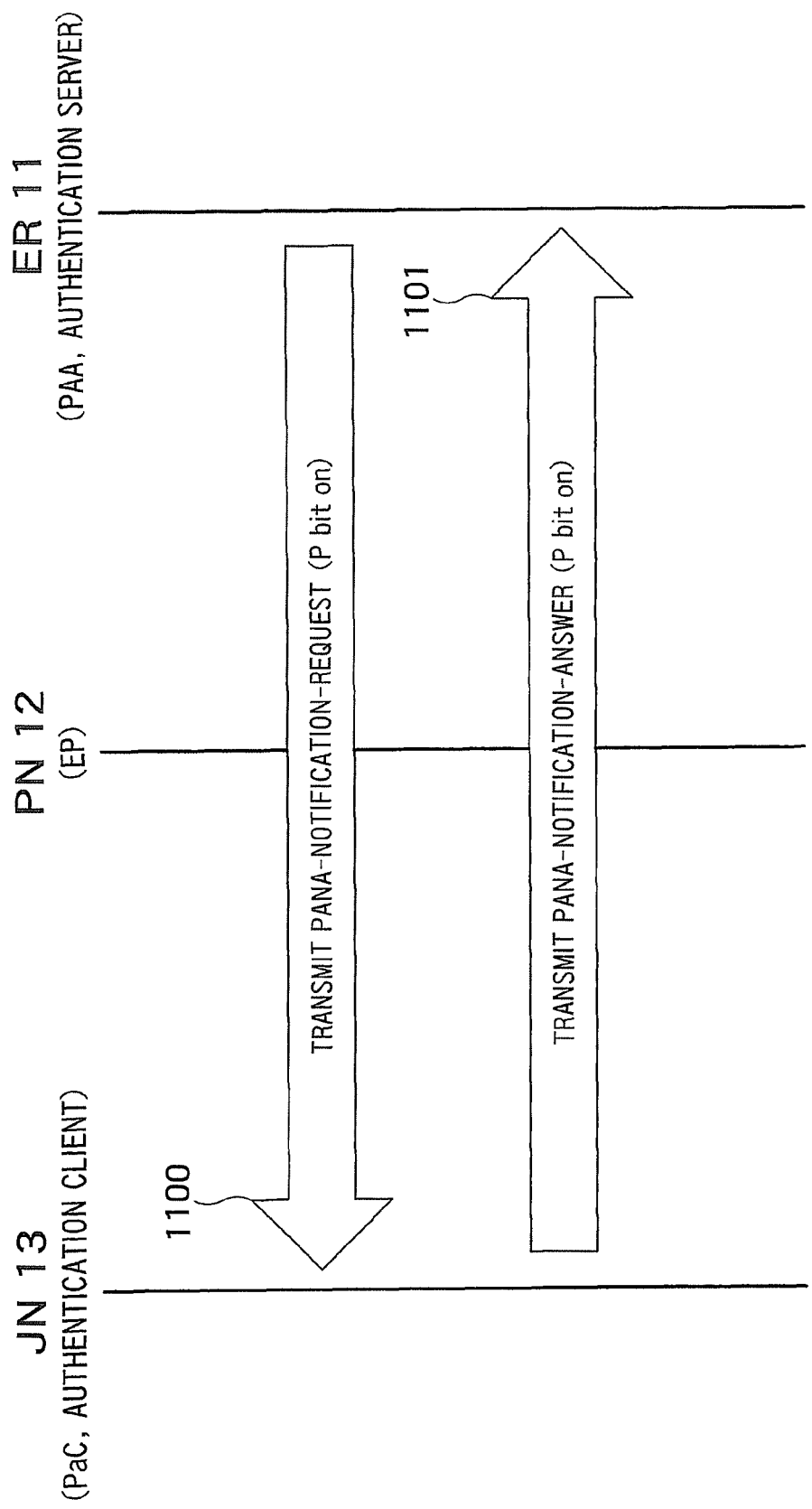
FIG. 11 is a sequence diagram of updating the network key through a session check process according to a fifth embodiment.

FIG. 11 depicts an outline of a message sequence in the session check process (a first session check process) according to the fifth embodiment.

At first, the ER 11 transmits the PANA-NOTIFICATION-REQUEST message with P bit being "on" to the JN 13 (1100). The PANA-NOTIFICATION-REQUEST message with P bit being "on" connotes a PANA-based PING message (a session check request message). This PANA-NOTIFICATION-REQUEST contains Network Key AVP, and Network Key AVP contains the network key (a second network key) encrypted with the key transport key.

The JN 13, upon receiving the PANA-NOTIFICATION-REQUEST message, extracts the encrypted network key from Network Key AVP and decrypts the encrypted network key with the key transport key, thereby obtaining the network key (the second network key) in plain text. The JN 13 receiving the PANA-NOTIFICATION-REQUEST message transmits PANA-NOTIFICATION-ANSWER (a session check response message) with P bit being "on" to the ER 11 (1101).

The fifth embodiment can be combined with the second embodiment. In this case, the new network key (the second network key) and the key identifier, which are encrypted with the key transport key, are contained in the Network Key AVP Value in the PANA-NOTIFICATION-REQUEST message (the session check request message). The same effects as those of the second embodiment can be thereby additionally acquired.

As described above, according to the fifth embodiment, the session check request message transmitted to the JN 13 from the ER 11 contains the updated encrypted network key, thereby enabling the updated network key to be delivered and shared safely and at the low cost.

Sixth Embodiment

The fifth embodiment has exemplified the example of notifying of the updated network key by making use of the session check request message transmitted to the JN 13 from the ER 11, however, a sixth embodiment exemplifies a case of notifying of the updated network key by making use of the session check response message transmitted to the JN 13 from the ER 11.

FIG. 12 illustrates an outline of the message sequence in the session check request process (a second session check process) according to the sixth embodiment.

At first, the JN 13 transmits the PANA-NOTIFICATION-REQUEST message (the session check request message) with P bit being "on" to the ER 11 (1200).

In response to this message, the ER 11 transmits PANA-NOTIFICATION-ANSWER (a session check response message) with P bit being turned "on" and containing Network Key AVP to the JN 13 (1201). The encrypted new network key (a third network key) is contained in Network Key AVP.

The JN 13 extracts the encrypted network key from received PANA-NOTIFICATION-ANSWER and decrypts the encrypted network key with the key transport key, thereby obtaining the network key (the third network key) in plain text.

As described above, according to the sixth embodiment, the session check response message transmitted to the JN 13 from the ER 11 contains the updated encrypted network key, thereby enabling the updated network key to be delivered and shared safely and at the low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The communication device shown in FIG. 5 may also be realized using a general-purpose computer device as basic hardware. That is, the elements of the communication device can be realized by causing a processor mounted in the above described computer device to execute a program. In this case, the communication device may be realized by installing the above described program in the computer device beforehand or may be realized by storing the program in a storage medium such as a CD-ROM or distributing the above described program over a network and installing this program in the computer device as appropriate.

The invention claimed is:

1. A computer-implemented communication device comprising:
   a network access authenticating unit configured to execute a network access authentication process with an authentication server in order to establish a connection to a network, the network access authentication process including generation of information shared with the authentication server;
   a communication unit configured to receive an authentication result message from the authentication server when succeeding in the network access authentication process, the authentication result message containing an authentication result indicating success in the network access authentication process and an encrypted network key;
   a key transport key generating unit configured to generate a key transport key by use of the information generated in the network access authentication process; and
   a network key acquiring unit configured to acquire a network key by decrypting the encrypted network key contained in the authentication result message with the key transport key,
   wherein the communication unit encrypts data with the network key and transmits encrypted data to the network,
   the communication unit executes a first session check process of transmitting a session check request message to the authentication server and receiving a session check response message containing an encrypted first network key from the authentication server,
   the network key acquiring unit acquires a first network key by decrypting the encrypted first network key contained in the session check response message with the key transport key,
   the communication unit encrypts data with the first network key,
   the communication unit receives encrypted data from the network, decrypts the encrypted data with the network key and, executes, when failing in decrypting the encrypted data, the first session check process,
   the authentication result message and the session check response message contain encrypted key identifiers of the network key and the first network key,
   the network key acquiring unit acquires key identifiers by decrypting the encrypted key identifiers, and manages the key identifiers in the way of being associated with the network key and the first network key,
   the encrypted data received by the communication unit is attached with a key identifier, and the communication unit decrypts the encrypted data by use of the network key associated with the key identifier attached to the encrypted data.

2. The communication device according to claim 1, wherein the network access authentication processing unit executes a re-authentication process of a network access with the authentication server, the communication unit receives, when succeeding in re-authentication of the network access, a first authentication result message, the first authentication result message containing an authentication result indicating success in the re-authentication and an encrypted second network key, the key transport key generating unit generates a first key transport key by using the information shared with the authentication server, which is generated in the re-authentication process, the network key acquiring unit acquires a second network key by decrypting the encrypted second network key with the first key transport key, and the communication unit encrypts the data with the second network key.

3. The communication device according to claim 1, wherein the communication unit executes a second session check process of receiving a session check request message containing an encrypted third network key from the authentication server and transmitting a session check response message to the authentication server, the network key acquiring unit acquires a third network key by decrypting the encrypted third network key contained in the session check request message with the key transport key, and the communication unit encrypts the data with the third network key.

4. The communication device according to claim 1, wherein the network access authenticating unit executes the first session check process when the key identifier attached to the encrypted data is different from a latest key identifier acquired by the network key acquiring unit.

5. The communication device according to claim 1, wherein the network access authenticating unit executes the authentication process by using EAP (Extensible Authentication Protocol).

6. The communication device according to claim 5, wherein the key transport key generating unit generates the key transport key from MSK (Master Session Key) or EMSK (Extended Master Session Key) that is output by an EAP method.

7. The communication device according to claim 6, wherein the network access authenticating unit uses PANA (Protocol for carrying Authentication for Network Access) for EAP transport.

8. The communication device according to claim 6, wherein the key transport key generating unit generates the key transport key by use of a pseudorandom function having an argument of MSK or EMSK.

9. The communication device according to claim 8, wherein the key transport key generating unit uses a Pseudorandom function of PANA SA (Security Association) attributes as the pseudorandom function.

10. A communication method comprising:

executing a network access authentication process with an authentication server in order to establish a connection to a network, the network access authentication process including generation of information shared with the authentication server;

receiving an authentication result message from the authentication server when succeeding in the network access authentication process, the authentication result message containing an authentication result indicating success in the network access authentication process and an encrypted network key;

generating a key transport key by use of the information generated in the network access authentication process;

acquiring a network key by decrypting the encrypted network key contained in the authentication result message with the key transport key;

encrypting data with the network key and transmitting encrypted data to the network;

executing a first session check process of transmitting a session check request message to the authentication server and receiving a session check response message containing an encrypted first network key from the authentication server;

acquiring a first network key by decrypting the encrypted first network key contained in the session check response message with the key transport key;

encrypting data with the first network key;

receiving encrypted data from the network;

decrypting the received encrypted data with the network key; and executing, when failing in decrypting the received encrypted data, the first session check process, wherein the authentication result message and the session check response message contain encrypted key identifiers of the network key and the first network key, key identifiers are acquired by decrypting the encrypted key identifiers, and the key identifiers are managed in the way of being associated with the network key and the first network key, the encrypted data received by the communication unit is attached with a key identifier, and the received encrypted data is decrypted by use of the network key associated with the key identifier attached to the received encrypted data.

11. A computer-implemented communication device comprising:

a network access authenticating unit configured to execute a network access authentication process with an authentication server in order to establish a connection to a network, the network access authentication process including generation of information shared with the authentication server;

a communication unit configured to receive an authentication result message from the authentication server when succeeding in the network access authentication process, the authentication result message containing an authentication result indicating success in the network access authentication process, an encrypted network key and an encrypted key identifier of a network key;

a key transport key generating unit configured to generate a key transport key by use of the information generated in the network access authentication process; and a network key acquiring unit configured to acquire the network key by decrypting the encrypted network key contained in the authentication result message with the key transport key, and acquire a key identifier by decrypting the encrypted key identifier with the key transport key, and manage the key identifier in the way of being associated with the network key, wherein the communication unit encrypts data with the network key and transmits encrypted data to the network, the communication unit receives encrypted data attached with a key identifier, and decrypts the encrypted data by use of the network key associated with the key identifier attached to the encrypted data, the network access authenticating unit executes a re-authentication process of a network access with the authentication server when the key identifier attached to the encrypted data is different from a latest key identifier acquired by the network key acquiring unit, the communication unit receives, when succeeding in re-authentication of the network access, a first authentication result message, the first authentication result message containing an authentication result indicating success in the re-authentication, an encrypted first network key and an encrypted key identifier of a first network key, the key transport key generating unit generates a first key transport key by using the information shared with the authentication server, which is generated in the re-authentication process, the network key acquiring unit acquires the first network key by decrypting the encrypted first network key with the first key transport key, and acquires a key identifier by decrypting the encrypted key identifier with the first key transport key, and manages the key identifier in the way of being associated with the first network key, and the communication unit encrypts data with the first network key.

12. The communication device according to claim 11, wherein the network access authenticating unit executes the authentication process by using EAP (Extensible Authentication Protocol).

13. The communication device according to claim 12, wherein the key transport key generating unit generates the key transport key from MSK (Master Session Key) or EMSK (Extended Master Session Key) that is output by an EAP method.

14. The communication device according to claim 13, wherein the network access authenticating unit uses PANA (Protocol for carrying Authentication for Network Access) for EAP transport.

15. The communication device according to claim 13, wherein the key transport key generating unit generates the key transport key by use of a pseudorandom function having an argument of MSK or EMSK.

16. The communication device according to claim 15, wherein the key transport key generating unit uses a Pseudo-random function of PANA SA (Security Association) attributes as the pseudorandom function.

17. A computer-implemented communication method comprising:
executing a network access authentication process with an authentication server in order to establish a connection to a network, the network access authentication process including generation of information shared with the authentication server;
receiving an authentication result message from the authentication server when succeeding in the network access authentication process, the authentication result message containing an authentication result indicating success in the network access authentication process, an encrypted network key and an encrypted key identifier of a network key;
generating a key transport key by use of the information generated in the network access authentication process;
acquiring the network key by decrypting the encrypted network key contained in the authentication result message with the key transport key, and acquiring a key identifier by decrypting the encrypted key identifier with the key transport key, and managing the key identifier in the way of being associated with the network key;
encrypting data with the network key and transmitting encrypted data to the network;
receiving encrypted data attached with a key identifier, and decrypting the encrypted data by use of the network key associated with the key identifier attached to the encrypted data;
executing a re-authentication process of a network access with the authentication server when the key identifier attached to the encrypted data is different from a latest key identifier acquired;
receiving, when succeeding in re-authentication of the network access, a first authentication result message, the first authentication result message containing an authentication result indicating success in the re-authentication, an encrypted first network key and an encrypted key identifier of a first network key;
generating a first key transport key by using the information shared with the authentication server, which is generated in the re-authentication process;
acquiring the first network key by decrypting the encrypted first network key with the first key transport key, and acquiring a key identifier by decrypting the encrypted key identifier with the first key transport key, and manage the key identifier in the way of being associated with the first network key; and
encrypting data with the first network key.

* * * * *